(12) United States Patent
Mayer et al.

(10) Patent No.: US 11,141,924 B2
(45) Date of Patent: Oct. 12, 2021

(54) SYSTEM COMPRISING STUD AND TOOL, AS WELL AS METHOD FOR FIXING THE STUD TO AN OBJECT WITH THE AID OF THE TOOL

(71) Applicant: Woodwelding AG, Stansstad (CH)

(72) Inventors: Jörg Mayer, Niederlenz (CH); Gregor Eckhard, Rüschlikon (CH); Patricia Poschner, Uettligen (CH); Mario Lehmann, Les Pommerats (CH)

(73) Assignee: WOODWELDING AG, Stansstad (CH)

( * ) Notice: Subject to any disclaimer, the term of this patent is extended or adjusted under 35 U.S.C. 154(b) by 220 days.

(21) Appl. No.: 16/340,553

(22) PCT Filed: Oct. 6, 2017

(86) PCT No.: PCT/EP2017/075557
§ 371 (c)(1),
(2) Date: Apr. 9, 2019

(87) PCT Pub. No.: WO2018/069193
PCT Pub. Date: Apr. 19, 2018

(65) Prior Publication Data
US 2019/0255780 A1 Aug. 22, 2019

(30) Foreign Application Priority Data
Oct. 11, 2016 (CH) .................................. 01361/16

(51) Int. Cl.
*B32B 37/00* (2006.01)
*B29C 65/08* (2006.01)
(Continued)

(52) U.S. Cl.
CPC ............ *B29C 65/08* (2013.01); *B29C 65/645* (2013.01); *B29C 65/7841* (2013.01);
(Continued)

(58) Field of Classification Search
USPC ....................................................... 156/580.1
See application file for complete search history.

(56) References Cited

U.S. PATENT DOCUMENTS

| | | | | |
|---|---|---|---|---|
| 5,271,785 A | * | 12/1993 | Devine | B29C 66/81431 156/73.2 |
| 7,160,405 B2 | * | 1/2007 | Aeschlimann | B29C 65/606 156/73.1 |
| 8,197,624 B2 | * | 6/2012 | Beehag | B29C 65/08 156/73.1 |

FOREIGN PATENT DOCUMENTS

| | | |
|---|---|---|
| CN | 104249452 | 12/2014 |
| DE | 30 16 590 | 11/1981 |

(Continued)

OTHER PUBLICATIONS

European Office Action dated Apr. 30, 2020, Application No. 17 781 094.2, 7 pages.
(Continued)

*Primary Examiner* — James D Sells
(74) *Attorney, Agent, or Firm* — Rankin, Hill & Clark LLP

(57) ABSTRACT

A system and a method for stud fixation with the aid of mechanical vibration energy that is applied to the stud and that is used for local liquefaction or at least plastification of a material, which is based on a thermoplastic polymer and includes the stud (at least distal stud end) and/or by the object (at least in a fixation location), wherein simultaneously the distal stud end is pressed against the fixation location of the object. Depending on the material pairing of stud (distal stud end) and object (fixation location), this results, on re-solidification of the liquefied or plasticized material, in an embedding of the distal stud end in the object (e.g. positive fit connection), in a welded connection between the distal stud end and the object, or in a local
(Continued)

penetration of stud material into the object (e.g. positive fit connection).

27 Claims, 8 Drawing Sheets

(51) Int. Cl.
    *B29C 65/64*       (2006.01)
    *B29C 65/78*       (2006.01)
    *B29C 65/00*       (2006.01)

(52) U.S. Cl.
    CPC ........ *B29C 65/7844* (2013.01); *B29C 66/112* (2013.01); *B29C 66/131* (2013.01); *B29C 66/474* (2013.01); *B29C 66/7392* (2013.01); *B29C 66/742* (2013.01); *B29C 66/81431* (2013.01); *B29C 66/8322* (2013.01); *B29C 66/861* (2013.01); *B29C 65/7847* (2013.01); *B29C 66/30221* (2013.01); *B29C 66/30321* (2013.01); *B29C 66/30325* (2013.01)

(56) References Cited

FOREIGN PATENT DOCUMENTS

| | | |
|---|---|---|
| EP | 0 537 824 | 4/1993 |
| EP | 1 000 732 | 5/2000 |
| EP | 1 016 796 | 7/2000 |
| EP | 2 998 104 | 3/2016 |
| FR | 1519111 | 3/1968 |
| JP | 54-101878 | 8/1979 |
| JP | 59-145112 | 8/1984 |
| JP | 63-149283 | 9/1988 |
| WO | 2007/109855 | 10/2007 |
| WO | 2016/054751 | 4/2016 |

OTHER PUBLICATIONS

English translation of International Preliminary Report on Patentability dated Apr. 16, 2019 (Apr. 16, 2019), Application No. PCT/EP2017/075557, 7 pages.

Switzerland Search Report dated Feb. 3, 2017, Application No. 13612016, 3 pages.

\* cited by examiner

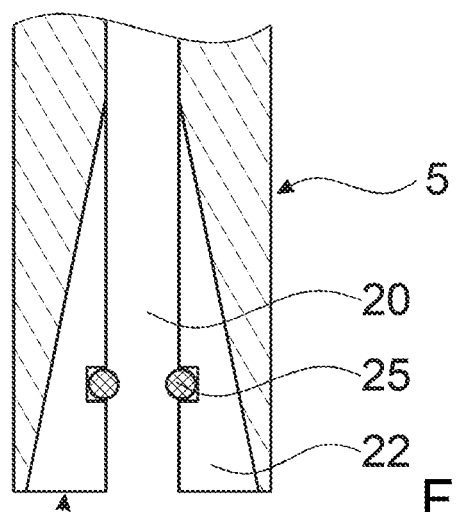
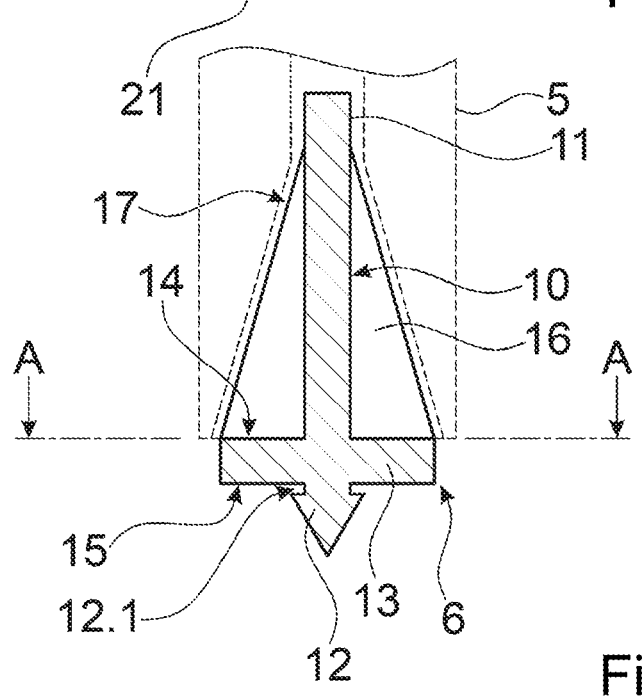
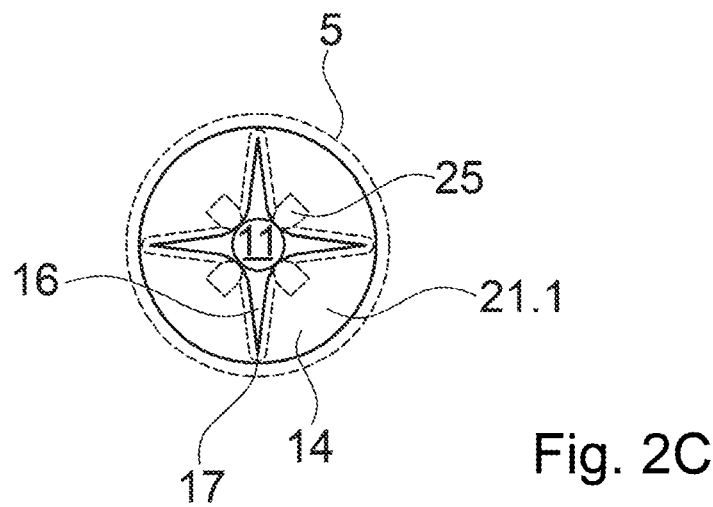

SYSTEM COMPRISING STUD AND TOOL, AS WELL AS METHOD FOR FIXING THE STUD TO AN OBJECT WITH THE AID OF THE TOOL

FIELD OF THE INVENTION

The invention is in the field of mechanical engineering and building technology. It concerns a system comprising a stud and a tool, and it further concerns a method for fixing the stud to an object with the aid of the tool. The main application of system and method according to the invention is the fixation of studs to thin walled ducts of a polymer material (e.g. air ducts of an air conditioning system, water pipes, cooling/heating medium ducts), wherein the studs serve for securing matting (e.g. insulating matting) to the outside surface of the duct. However, the system and the method according to the invention are not limited to the named main application but are also suitable for other applications such as e.g. fixing studs to objects which are not thin-walled and/or do not consist of a polymer material, wherein the fixed studs may serve any desired purpose.

BACKGROUND OF THE INVENTION

According to the state of the art, insulation matting (e.g. of foamed plastics such as polystyrene, polyurethane or polyethylene, or of mineral wool, glass wadding or of materials made from vegetable or animal fibers) is fixed to ducts consisting of sheet metal (e.g. steel, aluminum of a thickness of a few millimeters) with the aid of thin metal studs (usually steel or copper), which are provided with a plate-shaped head on the outside of the matting. The stud has a length which corresponds approximately to the thickness of the matting material (typically 20 to 100 mm), and it has a diameter (usually 2 to 5 mm) which is as small as possible but still renders the stud stiff enough for being capable to be pushed through the matting without the necessity of providing an opening therethrough. The plate-shaped head consists of any suitable material and has a flat expanse for securing a large enough matting area, such that the number of studs per area unit can be kept small.

The metal studs are usually fixed to the metal duct by stud welding techniques using a hand welding gun connected to a usually mobile control and power unit by a cable. The studs are welded to the duct in a first step. In a second step the matting is positioned against the duct by pushing it onto the fixed studs, and, in a third step, the head plates are fixed to the free stud ends protruding from the positioned matting.

Alternatively, the matting is first positioned against the duct and then the studs are pushed through the positioned matting and welded to the duct, wherein use of headed studs is possible. It is further possible to provide the matting with the studs already positioned therein and to position matting and ducts together relative to the duct. With the named method for fixing metal studs to metal ducts and using good equipment and experienced man power welding is possible with a performance of up to 150-200 studs per hour.

For fixing insulation matting to building walls, e.g. threaded bolts in combination with expanding polymer sleeves are used, wherein for each bolt a bore needs to be provided at least in the building wall and, for being mounted, the bolt needs to be rotated into the bore, which renders the fixing process considerably more time consuming than the above briefly described stud welding process.

Presently, in the building and other industries and generally in mechanical constructions, more and more parts are made of thermoplastic polymers, e.g. of PPS (flame retarded polypropylene)). An example of objects that are nowadays made of thermoplastic polymers are air ducts. Such air ducts have a wall thickness comparable to the wall thickness of metal ducts in the range of usually between 3 and 10 mm. For fixing matting to such polymer ducts with the aid of studs, the above named stud welding process is not applicable. Similar considerations apply for other relatively thin walled parts of thermoplastic materials.

SUMMARY OF THE INVENTION

The object of the invention is to provide a system comprising a stud and a tool, as well as a method for fixing the stud to an object with the aid of the tool. Therein, system and method according to the invention are to be in particular applicable for fixing the stud to a thin walled polymer duct, the stud being in particular suitable for securing e.g. insulation matting to the duct. The fixing process to be achieved with system and method according to the invention is to be comparable with the stud welding process used, as mentioned further above, for fixing metal studs to metal ducts. This means, in particular, that one tool and the same process parameters or process parameters within a narrow range are to be applicable for as many differing stud geometries (in particular stud lengths), stud materials, and applications. It further means, that using system and method according to the invention is to achieve results which are comparable with the results achieved with the stud welding process, in particular regarding absence of preparatory steps on the side of the duct, quality and accuracy of the fixation, ease of handling stud and tool, time and force necessary for the fixation process, simplicity of a stud manufacturing process, and availability of a stud material.

However, system and method according to the invention are to be applicable not only for stud fixation on thin-walled polymer ducts, but also for fixing studs to other objects, which in particular are not thin-walled and/or do not consist of a material comprising a thermoplastic polymer. Examples of such other objects and applications are paneling of walls, cladding with thick TP- or PVC-foils, fixing of e.g. felt mats or other fibrous matting on plastic or metal body parts of cars.

These objects are achieved with the system of stud and tool and with the method according to the invention.

Generally speaking, stud fixation according to the invention is achieved with the aid of mechanical vibration energy (in particular ultrasonic vibration energy) which is applied to the stud and which is used for local liquefaction or at least plastification of a material which is based on a thermoplastic polymer and which is comprised by the stud (at least distal stud end) and/or by the object (at least in a fixation location), wherein simultaneously the distal stud end is pressed against the fixation location of the object. Depending on the material pairing of stud (distal stud end) and object (fixation location), this results, on re-solidification of the liquefied or plasticized material, in an embedding of the distal stud end in the object (e.g. positive fit connection), in a welded connection between the distal stud end and the object, or in a local penetration of stud material into the object (e.g. positive fit connection).

The tool of the system according to the invention is preferably an ultrasonic hand piece which is operated by a human operator or possibly by a robot, and which comprises a vibration source with e.g. piezoelectric elements, and a transmitting element, a sonotrode. The sonotrode is connected to the vibration source, possibly via a booster. The hand piece is connected by a cable to a control and power unit, which may be stationary or moveable. However, the hand piece itself may comprise elements of the control and power unit, or it may be a fully independent battery driven device. The vibration source is designed to be powered by an alternating current in the range of 50 to 500 W and 10 to 100 kHz (e.g. 20 or 40 kHz). The arrangement of booster and sonotrode is preferably designed for a longitudinal vibration amplitude in the range of 10 to 100 μm (e.g. 60 μm) at the distal face of the sonotrode, wherein the vibrating system is preferably designed for maximum vibration amplitude at this distal face. However, vibration of the sonotrode may also have a main direction perpendicular to the sonotrode axis or may be a rotating vibration oriented around the sonotrode axis.

The stud of the system according to the invention comprises an elongated shaft and a collar. The shaft has a distal and a proximal end. The collar extends at a right angle or possibly obliquely from around the shaft in a position along the longitudinal shaft axis such that a proximal shaft portion extends beyond a proximal face of the collar. This proximal collar face serves for coupling vibration and pressing force used for the fixation process into the stud. The collar may in addition or alternatively serve for limiting a depth to which, during the fixation process, the distal stud end penetrates into the object and/or for laterally stabilizing the fixed stud. Preferably, the stud is made of one material only, i.e. shaft and collar are one integral piece. Preferably, the stud material is a polymer-based material, but it may also be a metal. The stud material and further features of the stud geometry are dependent on the function of the fixed stud, on the object to which the stud is to be fixed and on features of the fixation method.

The sonotrode of the tool of the system according to the invention has a geometry which is adapted to the stud such that the distal sonotrode face can be brought into contact with the proximal collar face and preferably such that the stud can be held by the sonotrode for positioning the stud relative to the object on which it is to be fixed.

For accommodation of the proximal shaft portion extending beyond the proximal collar face, the sonotrode comprises an axial channel which is open at the distal sonotrode face. The distal sonotrode face (or, for a tubular sonotrode, the sonotrode cross section) is adapted to the proximal collar face such that efficient vibration and force transmission is possible. The axial length of the sonotrode channel is preferably sufficient for handling, of a selection of studs to be handled, also the one with the longest proximal shaft portion. The cross section of the sonotrode channel is adapted to the cross section of the proximal shaft portion such that the stud can be securely held and guided by the sonotrode.

In examples, the sonotrode may be equipped to hold and/or guide the proximal shaft portion not only for the fixation process but also for positioning the stud relative to the fixation location on the object to which the stud is to be fixed. The system may thud comprise a holding mechanism for holding and/or guiding the (proximal) shaft portion of the stud relative to the sonotrode. For this purpose, at least one holding element may be arranged within the sonotrode channel. For preventing undesired vibration transmission from such a holding element to the proximal shaft portion of the stud, the holding element may be a resilient element. It may for example be arranged in an axial position of the sonotrode which constitutes a vibration node (location of minimal vibration energy or amplitude). In examples, the resilient element may be an elastomeric body, such as a an elastomeric ring or similar; it may also comprise a plurality of elastomeric bodies. In an other example, the holding element may comprise a spring mounted holding body, i.e. the resilience then is in the spring.

Especially in embodiments in which the holding element is not in an axial position of a vibration node, the holding element may be configured to allow a limited relative axial movement of the holding element relative to the sonotrode and/or relative to the stud. For example, the holding element may be mounted in a structure (for example indentation, such as a groove) with a limited axial extension that confines a relative movement. The structure may for example be such that the axial play is at least in the region of the applied amplitude. As an option, the holding elewment may comprise a spring mounted body allowing some axial movement against a spring force, optionally also confined to at least approximately the applied amplitude. The holding element thus in such examples allows a holding of the stud by the sonotrode for positioning while preventing a vibrational coupling through the holding element.

In other embodiments the holding mechanism may comprise a suction arrangement to generate underpressure in the channel for holding the stud relative to the sonotrode.

Again, very generally speaking, the method according to the invention comprises a step of positioning the stud with its distal end facing the fixation location of the object and a step of fixing the distal stud end to the fixation location with the aid of the vibration energy and the pressing force being applied to the stud simultaneously via the sonotrode. Therein, a matting or other material which may have to be fixed to the object with the aid of the stud is positioned against the object when the studs are positioned and fixed, i.e. is pushed onto the studs. However, the studs may also be positioned and fixed through matting which is already positioned against the object, or the matting may be provided with the studs positioned therein, and the studs are fixed after positioning the matting comprising the studs against the object.

The method according to the invention may especially comprise using any embodiment or example of a system according to the invention, thus, the features mentioned herein to describe the system are also applicable to the method, and vice versa.

According to a first exemplary embodiment of the invention, the step of stud fixation comprises embedding a distal tip of the stud in an object material which is based on a thermoplastic polymer and which is liquefiable with the aid of the vibration energy supplied to the stud. This means that the object (at least in the fixation location) comprises a thermoplastic polymer, and it further means that the whole stud or at least the distal stud end is made of a material which cannot be liquefied or plasticized by the vibration under the process conditions. The stud, therefore, consists e.g. of a metal (steel, copper or aluminum alloy), of a filled or non-filled thermoset polymer material (e.g. glass fiber reinforced epoxy or polyester resin), or of a filled or non-filled thermoplastic polymer material (e.g. PEEK, aromatic polyamide, PET, PA66) having a relevantly higher melting temperature range (at least 50° C.) or a relevantly higher (e.g. double) elasticity module due to higher filler concentration (e.g. filled with 20 to 50% of fibers) than the object material in which the distal stud end is to be embedded.

The stud suitable for the first exemplary embodiment of the invention comprises, in addition to the proximal shaft portion extending beyond the proximal collar face, a distal shaft portion extending beyond the distal collar face and preferably comprising a distal end facilitating pushing it into the material of the fixation location (e.g. tapering tip, plurality of tapering tips, tapering ring). Furthermore, the distal shaft portion or at least the tip thereof preferably comprises undercut surface structures or a geometry which is suitable for a positive fit connection with the material in which this distal shaft portion is embedded.

The first embodiment of the invention is in particular suitable for the preferred application as specified further above, i.e. for fixing studs to thin-walled ducts made of a thermoplastic polymer, e.g. of PPS, PP, PVC or PTFE and alike, the studs being suitable for securing matting (e.g. insulation matting) against the duct, wherein the studs are fixed to the duct before positioning the matting. For this application, the studs are e.g. of a filled or non-filled polymer material such as e.g. PEEK, aromatic polyamide, PET, or PA66. For having a small enough cross section area and still a mechanical stability sufficient for easy penetration of the matting, the shaft of the stud may comprise longitudinal reinforcing ribs which preferably have a narrow or even sharp outer edge suitable for cutting through the matting material. The collar of the stud is e.g. located proximally adjacent to the distal tip of the shaft and serves not only for coupling the vibration and the pressing force into the stud (proximal collar face) but also for limiting the penetration depth (distal collar face), which penetration depth limitation is particularly important for stud fixation to thin-walled objects in which too deep penetration means damage of the object.

According to the first embodiment of the invention using the stud as described above for the preferred application of matting fixation on thin-walled polymer ducts, the proximal shaft portion of the stud is introduced into the sonotrode channel such that the distal sonotrode face contacts the proximal collar face and such that the stud is held by the sonotrode. The distal end of the shaft (tip) is then positioned against the fixation location of the object (positioning step). For the fixation step, the stud is then pressed against the fixation location, the pressing force being applied through the sonotrode to the collar of the stud by corresponding pressing of the hand piece against the object by a human or robotic operator. At the latest when the stud tip is pressed against the fixation location, the vibration source is activated and the thermoplastic material of the fixation location starts to be heated due to friction between the vibrating stud and the fixation location, and therewith to be liquefied or at least plasticized, allowing the stud tip to be advanced into this material by further advancement of the hand piece. Thereby, further thermoplastic material is liquefied and surrounds the stud tip filling any undercut retention structures provided on the tip. As soon as the distal collar face abuts the object surface, the desired embedding depth is achieved, i.e. the vibration source is to be deactivated. The operator or corresponding sensor means sense the point in time for deactivation of the vibration source through a relevant increase in the resistance to further advancement of the stud caused by the collar abutting the surface of the object. The hand piece is kept in the same position for a moment more, i.e. for the time necessary for the thermoplastic material to re-solidify enough for being able to carry the stud securely. The hand piece is then removed.

If matting is to be fixed to the object with the aid of studs fixed as above described, the matting is positioned by being pushed on a plurality of fixed studs, wherein the proximal shaft portion needs to have a length which is about the same or larger than the matting thickness. The positioned matting is then secured to the object by fixing head plates to the free stud ends protruding from the matting. This can be achieved by any known and suitable method, e.g. by snapping the head plate into a groove provided on the stud end or by ultrasonically welding a head plate of a polymer material to the end face of the stud.

The above briefly described first embodiment of the invention may be varied in the following manner:

The stud is made of metal (e.g. steel, aluminum or copper alloy) and due to the higher strength and modulus of its material may be stiff enough without the stiffening ribs. Furthermore, the time for consolidation, i.e. for re-solidification or the liquefied material is shortened due to better heat dissipation through the metal stud.

The collar of the stud is arranged on the shaft in a more proximal position, the length of the distal shaft portion corresponding with the sum of penetration depth and matting thickness, wherein the stud is positioned and fixed through the positioned matting or is provided within the matting and positioned together with the latter, wherein the collar may serve as head plate. Such a stud does not allow control of depth penetration using the distal collar face, unless the stud comprises a further collar portion arranged adjacent to the shaft tip and constituting the distal collar face. Alternatively, penetration depth can be controlled through the hand piece which for this purpose may comprise, connected to the tool housing, a plurality of protrusions abutting with the object surface, when the desired penetration depth is achieved, or a spring born tube in contact with the object surface and being moved proximally against the spring force. In both cases, achievement of the desired penetration depth is marked by an increase in resistance against further advancement which may be used as signal for automatic stopping of the vibration.

In a second exemplary embodiment of the invention the stud is fixed to the object by being ultrasonically welded to the fixation location. This means that the material of the stud (distal stud end) and the material of the object (fixation location) are both to be based on thermoplastic polymers and are to be chosen to be weldable, i.e. having melting temperatures in similar ranges and being mutually wettable. The two materials may e.g. be based on the same thermoplastic polymer (e.g. PPS), which may be filled with similar or differing fibers or particles in similar or differing concentrations. Furthermore, for achieving a sufficient fixation stability, a larger fixation area is needed than is the case for the first embodiment of the invention. Therefore, the collar is arranged at the distal end of the shaft (no distal shaft portion extending beyond the distal collar face), and the distal collar face is welded to the object. For this purpose, the distal collar face is preferably equipped with energy directors, e.g. with a pattern of points or lines protruding from a main surface. The stud is preferably fully made of the material based on the weldable thermoplastic polymer and may therefore comprise longitudinal strengthening ribs as above described for the stud of the first embodiment of the invention.

If matting is to be fixed to the object with the aid of the fixed studs, the matting is pushed onto the fixed studs and head plates are secured to the proximal stud ends as above described for the first embodiment of the invention.

The above briefly described second embodiment of the invention may be varied in the following manner:

Only the collar of the stud or only the distal collar face comprises the thermoplastic polymer, wherein, depending on the material of the shaft, no strengthening ribs need to be provided.

According to a third embodiment of the invention the stud or at least the distal stud end comprises a material based on a thermoplastic polymer, and the object or at least the fixation location of the object comprises a material which is penetrable by the liquefied stud material, i.e. it is a porous or fibrous material (e.g. wood, chipboard, plywood, foam metal, polymer foam, porous ceramic material) or it comprises a preferably undercut surface structure suitable for such penetration (e.g. suitable roughness, particulate coating, pattern of cavities or grooves).

All further features and variations as above described for the first embodiment of the invention are applicable also for the third embodiment of the invention.

BRIEF DESCRIPTION OF THE DRAWINGS

The invention is illustrated and described in further detail in connection with the appended Figs., wherein:

FIGS. 2A/B/C illustrate an exemplary stud and a sonotrode suitable for cooperation with the stud, stud and sonotrode being applicable in the first and third embodiment of the invention;

DESCRIPTION OF THE PREFERRED EMBODIMENTS

In all following Figs., same numerals denominate same elements or elements with similar functions.

It becomes clear from the following Figs. and the corresponding description, that a large number of different studs can be handled in the method according to the invention using the same tool or the same sonotrode respectively. It is also true that similar parameter sets are applicable for the three embodiments of the invention, as long as the overall dimensions of the stud remain within a specified range.

Figure 1:
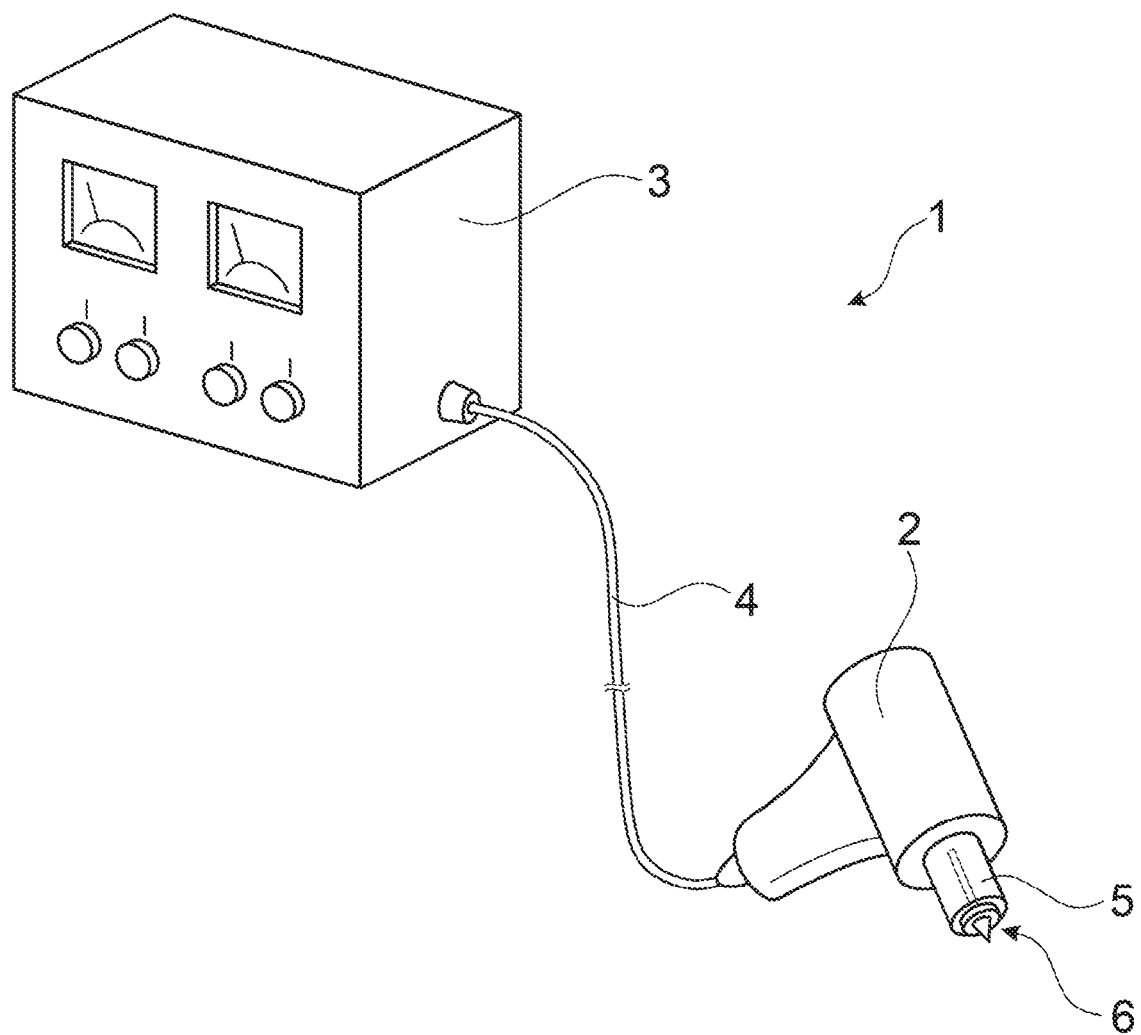
FIG. 1 illustrates an exemplary system according to the invention.

FIG. 1 shows very schematically an exemplary system according to the invention, the system comprising a tool 1 with an ultrasonic hand piece 2 and a control and power unit 3 being connected by a cable 4. The hand piece 2 comprises within a housing a vibration source (not shown) to which a sonotrode 5 is connected or connectable in a per se known manner. As already mentioned further above, the hand piece may comprise further elements of the control and power unit, such as a generator, or it may even be a fully independent, battery-driven unit. As described in further detail below, the sonotrode 5 comprises a longitudinal channel accommodating a proximal portion of a stud 6 of which a distal end (collar and possibly distal shaft portion) protrudes beyond a distal sonotrode face.

FIGS. 2A, 2B and 2C show an example of a cooperating pair of stud 6 and sonotrode 5 (only distal sonotrode end shown) suitable for the first embodiment of the invention, wherein FIG. 2A is an axial section of the sonotrode 5, wherein FIG. 2B is an axial section of the stud 6 (sonotrode 5 indicated in broken lines), and wherein FIG. 2C shows, on a somewhat larger scale, the stud 6 viewed against the proximal collar face 14 (viewing direction A as indicated in FIG. 2B, sonotrode 5 indicated in broken lines).

The stud 6 comprises a shaft 10 (proximal shaft portion 11 and distal shaft portion 12) and a collar 13 with a proximal collar face 14 and a distal collar face 15. The stud 6 may further comprise a plurality (e.g. four) of longitudinal reinforcing ribs 16 arranged around the proximal shaft portion 11, wherein an outer edge 17 of the ribs 16 may have a radial distance from the longitudinal stud axis which varies along the length of the ribs or is constant. In a preferred embodiment of the stud 6 as illustrated in FIGS. 2B and 2C, the ribs 16 merge into the proximal collar face 14, having adjacent to the proximal collar face 14 the largest radial extent being substantially the same as the radial extent of the collar 13.

Figure 3A:
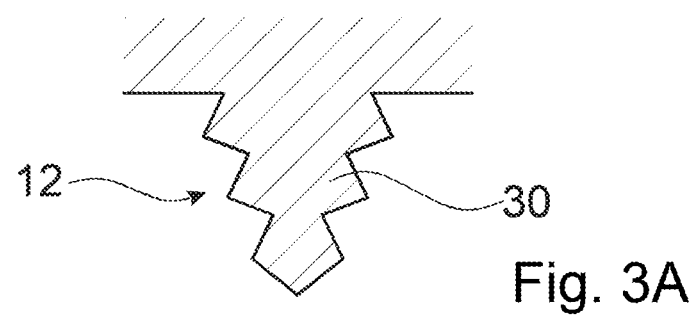
FIGS. 3A to C show further details of the tip of a stud suitable for the first embodiment of the invention.
Figure 3B:
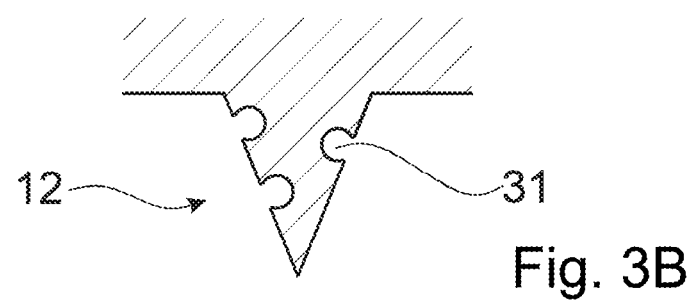
Figure 3C:
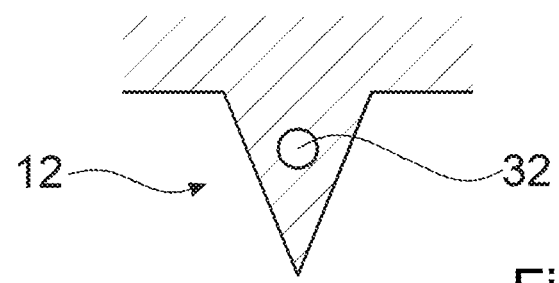

The distal shaft portion 12 of the stud 6 is shaped as a tapering tip and advantageously comprises an undercut structure such as e.g. a neck portion 12.1 with a smaller radius than a more distal tip part. Further exemplary embodiments of stud tips with undercut structures are illustrated in FIGS. 3A to 3C.

The sonotrode 5 as shown in FIGS. 2A to 2C comprises an axial channel 20, which is open at the distal sonotrode face 21 and may have a closed or an open proximal end. The channel 20 is dimensioned for accommodation of the proximal shaft portion 11 and, if applicable, comprises radial extensions 22 for accommodation of the ribs 16. The distal sonotrode face 21 is adapted to the proximal collar face 14, i.e., for the illustrated case, comprises four segments 21.1 fitting between the ribs 16.

For securely holding the proximal shaft portion 11 of the stud 6 within the channel 20 of the sonotrode 5, at least one resilient element 25 is arranged on the inside of the sonotrode channel 20, the resilient element(s) 25 being dimensioned for resiliently holding the proximal shaft portion 11 in a coaxial position relative to the sonotrode channel 20. As seen from FIG. 2C, for the present case four resilient elements 25 are arranged to be positionable between the ribs 16.

If the sonotrode channel 20 has a closed proximal end, it is obviously possible also to handle a stud 6 having a proximal shaft portion 11 which is longer than the sonotrode channel 20. Therein the stud is positioned in the sonotrode channel with the proximal shaft end abutting the closed channel end and vibration and pressing force are transmitted from the closed channel end to the proximal shaft end. This means that the collar of the stud has no transmitting function and may be eliminated. However, a collar may be provided for the above mentioned penetration depth control.

FIGS. 3A to 3C illustrate further exemplary embodiments of undercut structures which may be provided on the tip (distal shaft portion 12) of a stud according to FIGS. 2A to 2C. These structures are, according to FIG. 3A: circumferential ribs which may extend in planes perpendicular to the shaft axis or spirally (thread-like), according to FIG. 3B: undercut cavities 31, and, according to FIG. 3C: a through opening 32.

Figure 4:
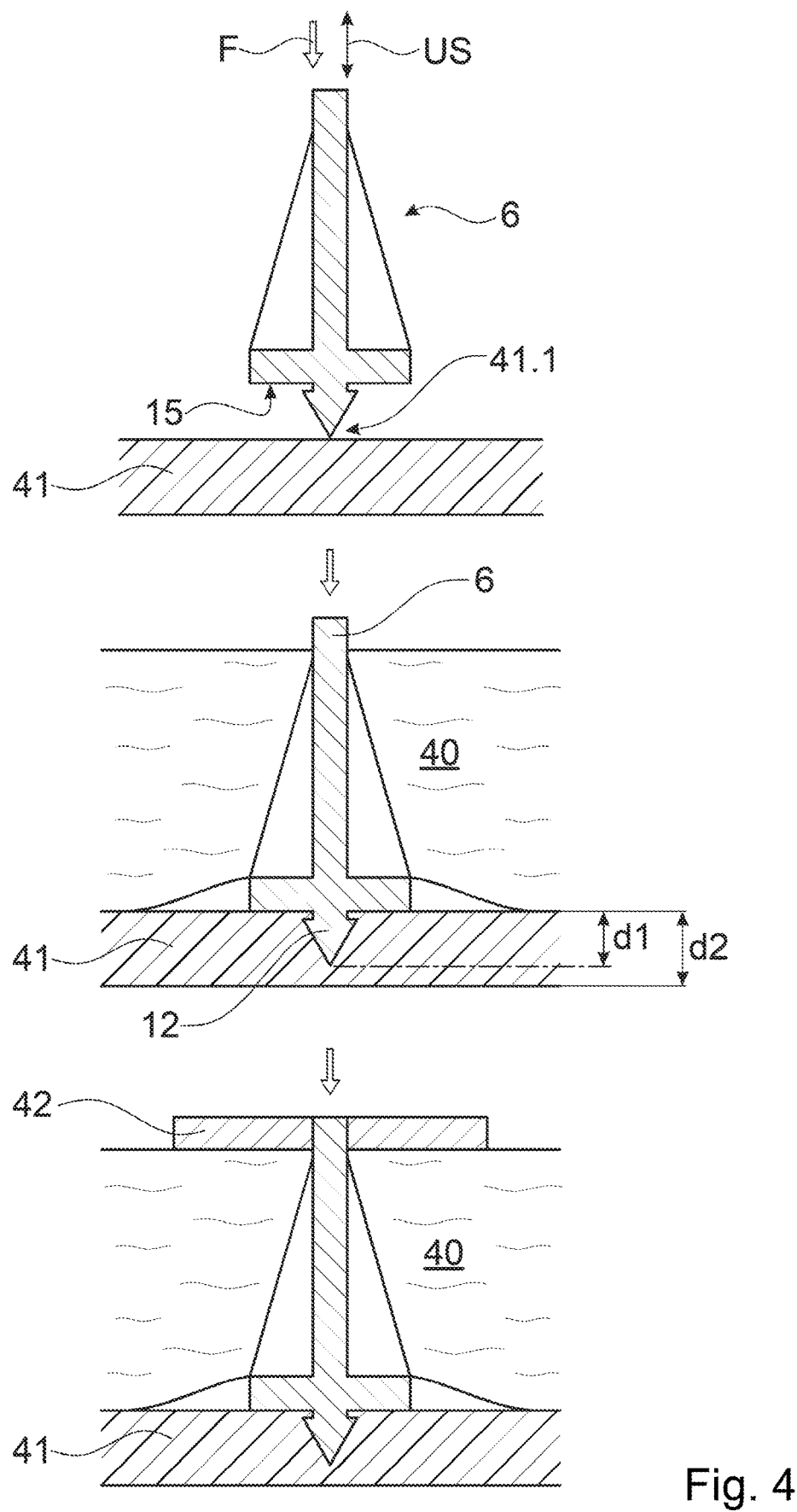
FIGS. 4-7 further illustrate the first and third embodiments of the invention with further examples of suitable studs.

FIG. 4 illustrates application of the first embodiment of the invention for fixing matting 40 to a thin-walled object 41 consisting of a material based on a thermoplastic polymer, e.g. on a thermoplastic air duct. The stud 6 is substantially the same as shown in the previous Figs., an applicable sonotrode is also the same as shown in the previous Figs., but is not shown in FIG. 4. Above, FIG. 4 shows the stud 6 positioned with its tip 12 against the fixation location on the object, ready for the fixation process, i.e. for application of the pressing force F and the ultrasonic vibration US necessary for embedding the stud tip in the material of the object.

In the middle, FIG. 4 shows the stud 6 being fixed to the object 41, i.e. the tip 12 of the stud 6 being embedded in the thermoplastic material of the object 41 and the distal collar face 15 abutting the surface of the object 41. The penetration depth d1 of the tip 12 in the thermoplastic material corresponds to the axial length of the distal shaft portion 12, or the tip respectively, i.e. is controlled by the distal collar face 15. Such control proves to be accurate and sufficient for securely omitting full penetration of the thin-walled object (wall thickness d2), even for cases in which the difference between d1 and d2 has to be as small as e.g. 1 to 3 mm. The middle part of FIG. 4 also shows matting material 40 being positioned against the object, wherein the matting is to be positioned after stud fixation.

Below, FIG. 4 shows a head plate 42 being fixed to the proximal stud end for finally securing the matting 40 against the object 41.

Figure 5:
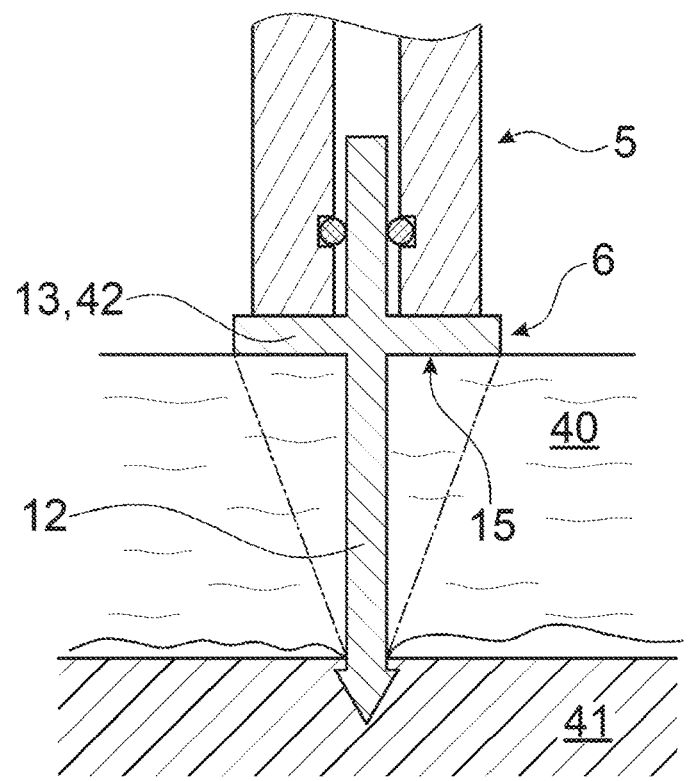

FIG. 5 shows a further example of a stud 6 suitable of being fixed to an object 41 according to the first embodiment of the invention and for securing matting 40 to the object, wherein e.g. the sonotrode as described in connection with FIGS. 2A to 2C is applicable. The distal shaft portion 12 comprising the undercut tip is long enough for penetrating the matting 40, and the collar 13 is positioned outside the matting 40. This means, that the collar can constitute the head plate 42, and t at the stud 6 can be positioned against the fixation location by being pushed through the already positioned matting 40 or can be provided and positioned together with the matting. It further means, that the distal collar face 15 cannot be used for controlling the penetration depth as above described, unless the matting 40 is mechanically stable enough to have a sufficiently well-defined thickness.

In an embodiment as illustrated in FIG. 5, it is possible to use the sonotrode 5 and possibly also the vibration energy supplied by the vibration source not only for stud fixation but also for pushing the distal shaft portion 12 through the matting.

Figure 6:
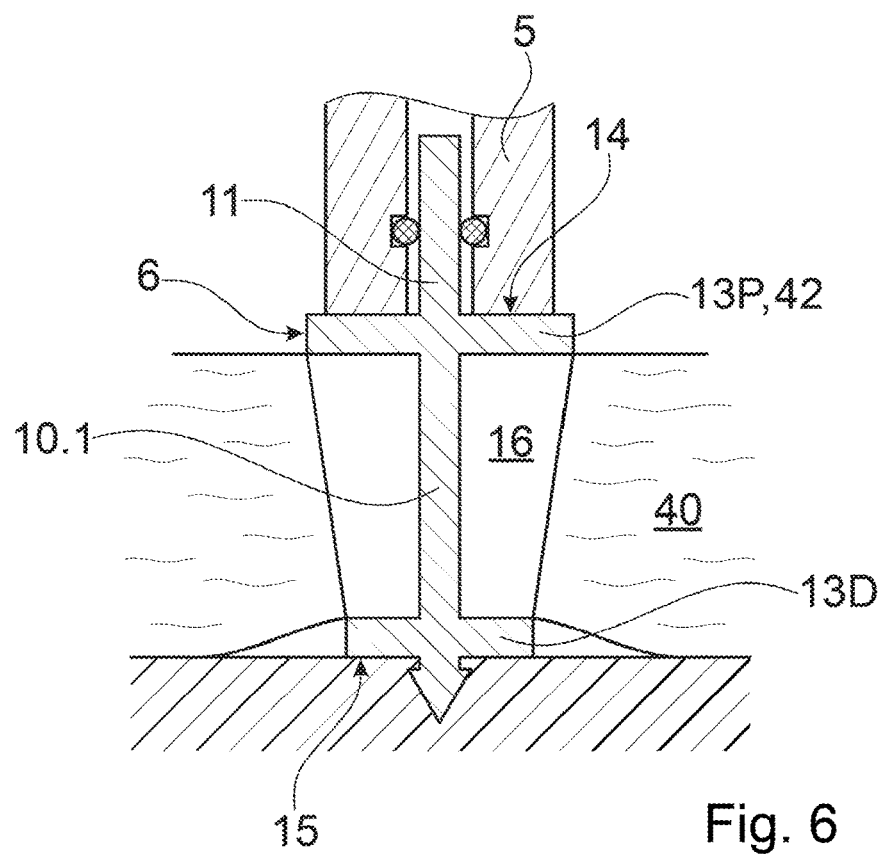

FIG. 6 shows a further embodiment of a stud 6 suitable of being fixed to an object 41 according to the first embodiment of the invention and for securing matting 40 to the object, wherein e.g. the sonotrode as described in connection with FIGS. 2A to 2C is applicable. The stud 6 according to FIG. 6 differs from the studs as described in connection with the previous Figs. in that it comprises a distal collar portion 13D and a proximal collar portion 13P, wherein the distal collar portion 13D carries the distal collar face 15 which may serve for penetration limitation, and wherein the proximal collar portion 13P carries the proximal collar face 14 which serves for coupling-in of vibration and pressing force and may also serve as head plate 42. A middle shaft portion 10.1 extending between the two collar portions 13D and 13P may have an axial length substantially corresponding with the thickness of a matting 40 to be secured with the aid of the stud, wherein the stud is positioned in the matting before the steps of positioning and fixing the stud. Furthermore, the middle shaft portion 10.1 may carry reinforcing ribs 16.

All studs illustrated in FIGS. 2A-C, 3, 4, 5 and 6 are preferably made fully of a polymer material (thermoset or thermoplastic as specified further above), wherein ribs 16 may be used to achieve a mechanical stud stability sufficient for a specific application. Such studs can easily be produced by injection molding.

Figure 7:
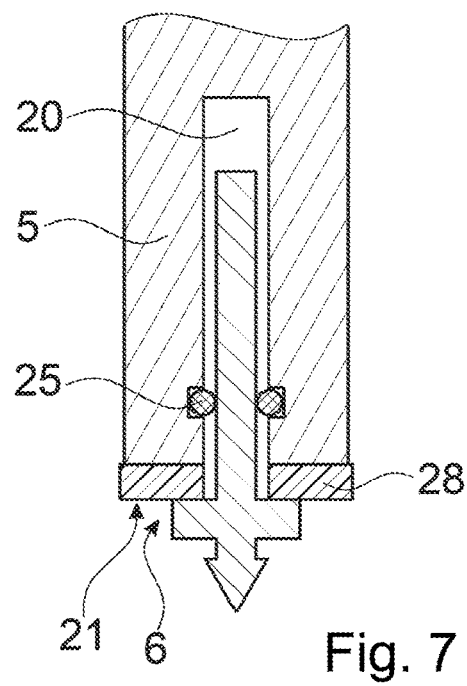

FIG. 7 illustrates in the same manner as FIGS. 2A and 2B a cooperating pair of stud 6 and sonotrode 5 (only distal sonotrode portion shown) which is suitable for the first embodiment of the invention. Therein the stud 6 is made of a metal and therefore will for most applications have a sufficient mechanical stability without the need of reinforcing ribs. This means, that this stud has a very simple form and can be manufactured from a metal rod in a process similar to the process of manufacturing screws from metal rod material. This is in particular valid because for a metal stud the collar may have a smaller radius than is the case for a polymer based stud and still provide satisfactory vibration and force transmission. If the relevant dimensions of the stud are comparable to the ones of the stud e.g. according to FIGS. 2A to 2C, the stud according to FIG. 7 can be fixed using the same sonotrode as illustrated in FIGS. 2A to 2C. However, as shown in FIG. 7, a simpler sonotrode with a sonotrode channel 20 of a constant cross section (no extensions for accommodating ribs) can be used, wherein the resilient element 25 is e.g. a simple O-ring.

For fixing a stud 6 whose collar 13 is made of a metal, the metal face of the sonotrode vibrates against the metal collar which may cause undesired noise. For preventing such noise, it may be advantageous to provide the distal sonotrode face or the proximal collar face with a damping layer 28 or a damping coating of e.g. of PEEK or Teflon (trade name).

All features described above in connection with FIGS. 3A to 3C, 4, 5, and 6 are applicable also for the stud according to FIG. 7.

FIG. 7 shows a closed proximal end of the sonotrode channel as mentioned further above. This closed channel end can be used, instead of the distal sonotrode face, for vibration and pressing force transmission to the proximal shaft end of a stud whose proximal shaft portion is longer than the axial length of the sonotrode channel.

Figure 8:
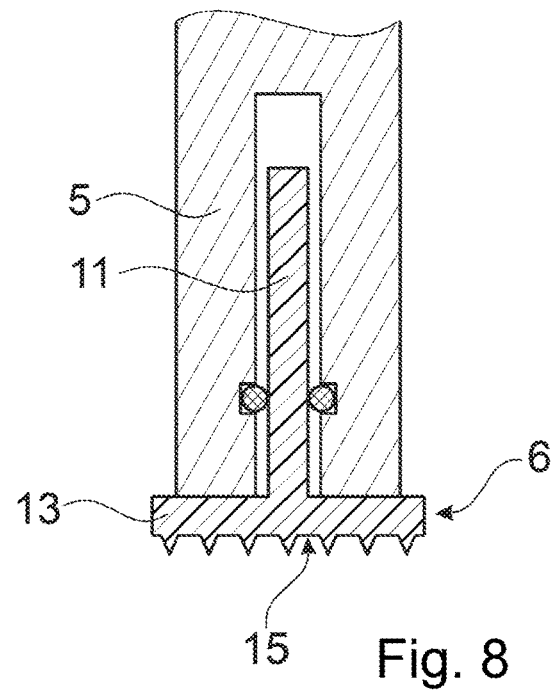
FIGS. 8-11 illustrate variants of the second embodiment of the invention with exemplary studs.
Figure 9:
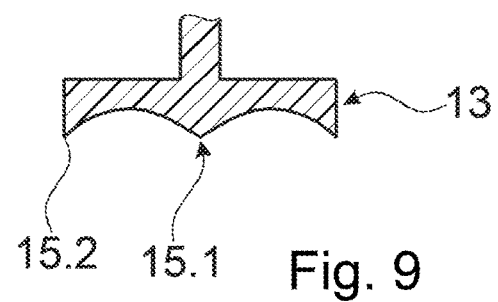

FIG. 8 shows a cooperating pair of stud 6 and sonotrode 5 (only distal sonotrode end shown), which are applicable for the second embodiment of the invention, according to which the distal collar face 15 of the stud is ultrasonically welded to the object. The collar 13 of the stud 6 is arranged at the distal end of the shaft 11, i.e. there is no distal shaft portion extending beyond the distal collar face 15, and this distal collar face 15 is preferably equipped with energy directing structures, such as e.g. a pattern of humps, points or ribs protruding from a main surface or a limited number of such points. FIG. 9 shows further exemplary energy directors in the form of a distal tip 15.1 and a ring 15.2, tapering distally to a sharp edge.

Figure 10:
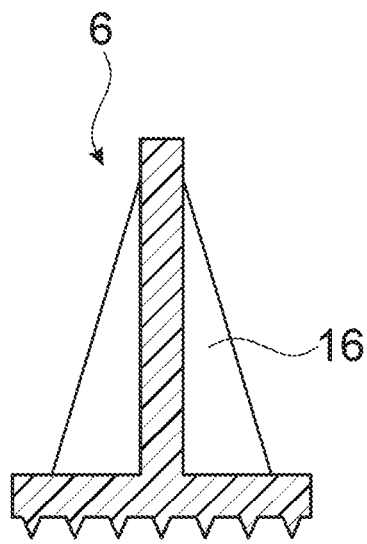
Figure 11:
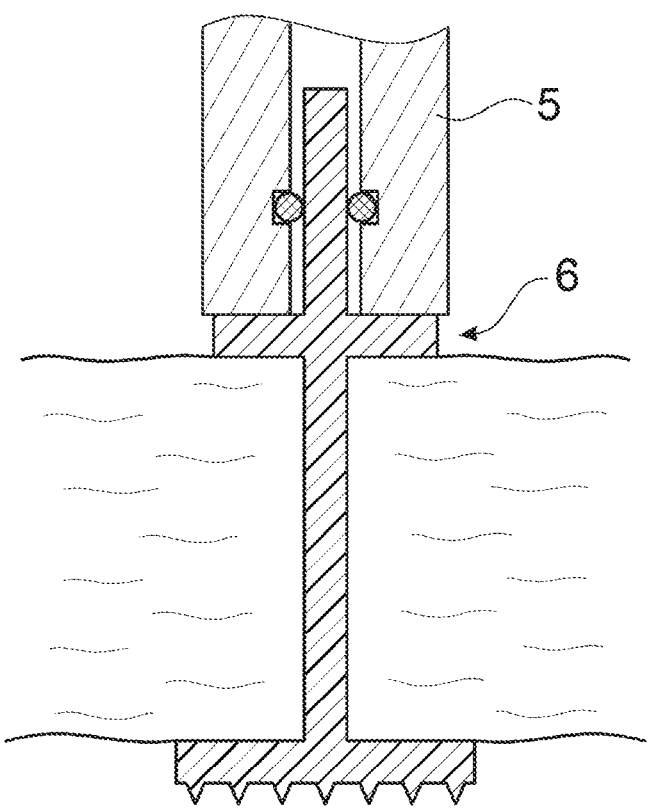
Figure 12A:
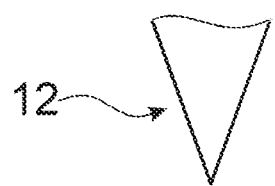
FIGS. 12A to D show exemplary embodiments of stud tips suitable for the third embodiment of the invention.
Figure 12B:
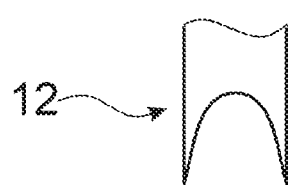
Figure 12C:
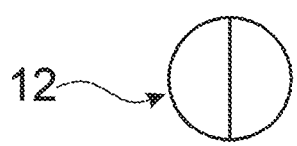
Figure 12D:
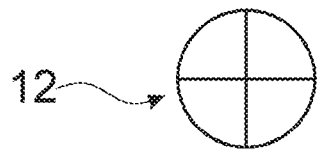

FIGS. 10 and 11 illustrate further examples of studs 6 suitable for the second embodiment of the invention. These studs differ from the stud of FIG. 8 by comprising reinforcing ribs 16 (FIG. 10) and/or by comprising a distal collar portion 13D and a proximal collar portion 13P. These features are described further above, wherein there the description refers to the first embodiment of the invention but is also valid for the second embodiment.

All features described above for a system suitable for the first embodiment of the invention are valid also for a system suitable for the third embodiment of the invention, except for the fact, that according to the third embodiment of the invention, at least the tip of the stud needs to comprise a material which is based on a thermoplastic polymer which is liquefiable by vibration energy. This tip does not need undercut structures but is to be shaped for promoting liquefaction. FIGS. 12A to 12D show suitable stud tips (distal shaft portions 12) tapering e.g. to one point (FIG. 12A, viewed from the side), to a plurality of points (FIG. 12B, viewed from the side), to a line FIG. 12C (viewed against the distal tip end), or to a plurality of lines (FIG. 12C (viewed against the distal tip end).

Figure 13:
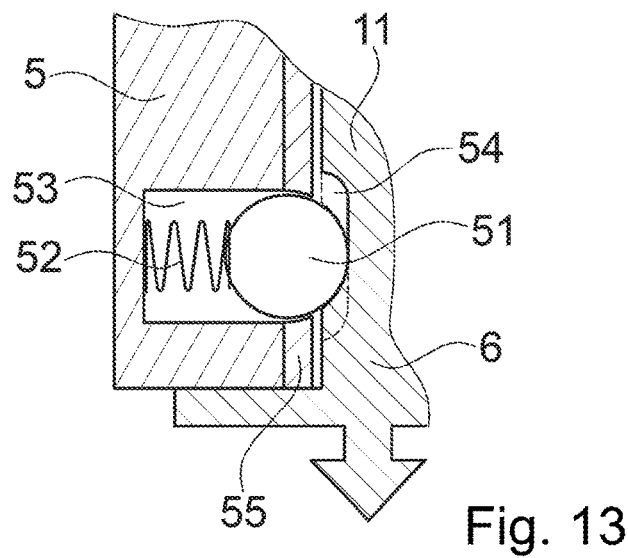
FIGS. 13-15 show details of exemplary systems with different holding mechanisms.

FIG. 13 shows a detail of a system suitable as example for the first embodiment as well as for the second and third embodiment. The example of FIG. 13 as well as the examples of FIGS. 14 and 15 described hereinafter address the following issue: In some configurations, if a resilient element 25 as shown for example in FIG. 2A is arranged in an axial position constituting a vibration node, it may be rather far away from the distal sonotrode face 21. Also, the axial position of the vibration node may vary during the process due to varying resonance conditions (for example, the wavelength may go down if the stud 6 is subject to a large compressing force).

Therefore, for some examples it may be desirable to have a configuration which does not rely on a resilient element for holding the shaft portion 11 being arranged in a position constituting a vibration node.

In the example of FIG. 13, the shaft portion holding element comprises a plurality of spring mounted holding bodies 51, here being holding balls, engaging in guiding indentations 54 (or possibly a circumferential guiding groove) of the shaft portion. For the springs 52 with the holding bodies 51, the sonotrode comprises holding cages 53 (here formed using a cage plate 55) or a corresponding circumferential holding groove in which the holding bodies 51 may be displaced against a radial spring force. The guiding indentations 54 in the depicted embodiment have a shallow ground and are thereby shaped so that a relative movement between the stud 6 and the sonotrode 5 is possible (the dashed line in FIG. 13 shows a possible displacement of the guiding indentation 54 relative to the illustrated holding body. During displacement, especially during vibration by an amplitude of the vibration, the stud may shift relative to the holding bodies 51, or the holding bodies may be subject to a slight rolling movement.

In addition or an alternative to the illustrated play defined by the shallow guiding indentations 54, the holding bodies 51 may be mounted in a manner that they could move axially relative to the sonotrode 5 to some extent, against an elastic force (not illustrated in FIG. 13).

Variants would be possible:
The holding bodies could have other shapes, different from balls.
Instead of the guiding indentation(s), the shaft portion could comprise guiding protrusions engaging in indented structures of the holding bodies.
More generally, the shaft portion of the stud could have any guiding structure cooperating with the holding body/holding bodies.
The holding bodies could be constituted by the inner end of the springs themselves.

The number of spring mounted holding bodies may for example be three or four, for example equally distributed around the periphery of the shaft.

Figure 14:
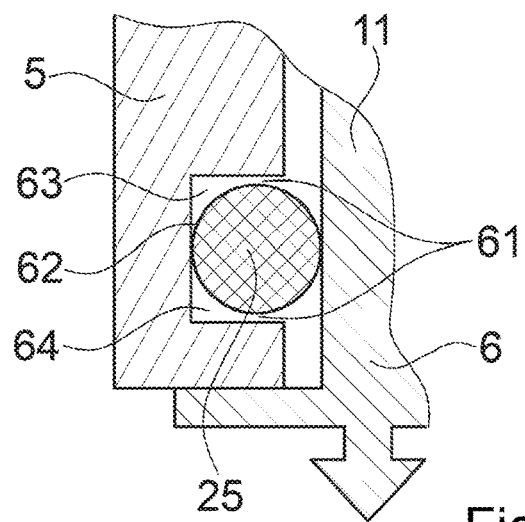

FIG. 14 shows an example in which the holding element is constituted by a resilient element 25, the resilient element for example extending around the shaft portion. The guiding element is placed in a circumferential groove 63 of the sonotrode 5. An axial dimension of the circumferential groove 63 is larger than a diameter of the resilient element 25 (upper and lower spaces 61 being shown in FIG. 14), whereby when the stud 6 is subject to mechanical vibration, the resilient element sticking onto the shaft portion 11 may move in axial directions relative to the sonotrode 5. The outer radius of the resilient element to this end may be such that it is not pressed against the bottom of the groove 63, i.e. such that there may for example be a small gap 62 between the resilient element 25 and the bottom of the groove 63. During transport, depending on the orientation, the resilient element 25 may sit on the distal surface 64 of the groove 63, or on the opposite surface, or approximately hold the stud in position in an other way.

A similar solution to the one described referring to FIG. 14 may be achieved if the holding element sits firmly on the sonotrode and is loose relative to the stud 6, for example with the stud having at least one guiding indentation. Also, in both configurations, instead of one circumferential resilient element, a plurality of resilient elements, each having a seat, may be present.

Figure 15:
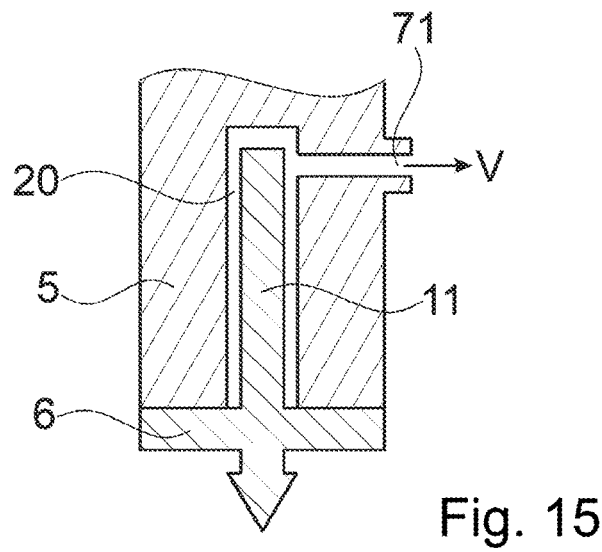

FIG. 15 shows an example in which the holding mechanism comprises a vacuum suction arrangement instead of a distinct holding element. Through a vacuum port 71, air is evacuated to generate an underpressure in the axial channel 20 so the stud 6 is held relative to the sonotrode, for example during transportation thereof to the fixing location. Evacuation may optionally also take place during the process of fixing. The interface between the distal sonotrode face and the collar is not completely airtight, especially during application of the vibration. However, as long as the evacuation power is sufficient to generate a substantial underpressure in the axial channel 20, the holding effect may suffice.

While the examples of FIGS. 13-15 are illustrated to be without reinforcing ribs, such reinforcing ribs are also an option for these embodiments, wherein either the holding element is not circumferential (but there are several holding elements, between the reinforcing ribs) or the holding element(s) is/are at an axial position different from the axial position of the reinforcing ribs.

EXAMPLES

The tool used for the experiments comprised a Branson LPE Handgun (20 kHz, 750 W) and an aluminum sonotrode of an outer diameter of 10 mm and a channel of 5.6 mm diameter (max vibration amplitude of 60 μm at the distal sonotrode face). The tool was used for fixing studs of aluminum or of PPS GF40% (PPS with 40% glass fiber filling) to a PPS object according to the first and the second embodiments of the invention. For the metal studs, a damping element of PEEK with a thickness of 1.5 mm was posed between the sonotrode face and the proximal collar face.

The aluminum studs had an axial length of 50 mm, a shaft diameter of 3.5 mm, a collar diameter of 10 mm and a collar thickness of 1.5 mm. The distal shaft portion had an axial length of 3 to 4 mm and was either a tip with a proximal diameter of 3 mm and circumferential grooves, or a tube of an outer diameter of 6.5 mm comprising through holes or circumferential grooves. For embedding (first embodiment of the invention) the distal shaft portion up to the distal collar face in the PPS object, the vibrating stud was pressed against the objects during 7 to 8 secs with a pressing force of 15 to 20 Kg (power output ca. 250 W). The vibration was then stopped and the stud held against the object for a further ca. 20 sec.

The PPS studs had an overall length of 50 mm, a shaft diameter of 5 mm, a collar diameter of 10 mm and a collar thickness of 3 mm. The stud had no distal shaft portion and the distal collar face was shaped as shown in FIG. 9. For welding the distal collar face to the object (second embodiment of the invention), the vibrating stud was pressed against the object during 4 to 5 sec with a pressing force of 5 to 10 K (power output: ca. 250 W). The vibration was then stopped and the stud held against the object for a further ca. 10 sec.

The two sorts of studs as above described were, in their fixed configuration, stably attached to the object and fully suitable to be pushed through insulation matting.

What is claimed is:

1. A system for fixing matting to an object with the aid of a plurality of studs being fixed to the object with the aid of liquefaction or at least plastification of a material based on a thermoplastic polymer, said material being comprised by the object, the system comprising:
   the studs, each stud comprising an elongated shaft having a distal end, a proximal end and a longitudinal axis therebetween, and a collar extending radially from the shaft, having a distal collar face and a proximal collar face and being arranged on the shaft with a proximal shaft portion extending beyond the proximal collar face,
   a tool comprising a vibration source capable of supplying mechanical vibration energy, and a sonotrode with a proximal sonotrode end and a distal sonotrode face, wherein the proximal sonotrode end is coupled or couplable to the vibration source, wherein the sonotrode is designed for vibration transmission from the proximal sonotrode end to the distal sonotrode face, and wherein the sonotrode further comprises an axial channel being open at the distal sonotrode face,
   a plurality of head plates, and
   the matting,
   wherein the axial channel is dimensioned for accommodation of the proximal shaft portion, and wherein the distal sonotrode face is adapted to the proximal collar face for enabling transmission of vibration and of a pressing force from the sonotrode to the stud,
   wherein the collar is arranged on the shaft for a distal shaft portion to extend beyond the distal collar face,
   wherein at least the distal shaft portion comprises a material which is not liquefiable by the vibrating enemy and further comprises a surface structure or geometry suitable for forming a positive fit connection with said material based on a thermoplastic polymer in which it is embedded,
   wherein the proximal shaft portion has a length which is about the same or lamer than a matting thickness, whereby the matting is capable of being secured to the object by means of the fixed studs in that the proximal shaft portion of the shafts of the fixed studs are caused to reach through the matting and in that the head plates are fixed to free stud ends that protrude from the matting.

2. The system according to claim 1, further comprising a holding mechanism configured to hold the shaft portion in the axial channel.

3. The system according to claim 2, wherein the holding mechanism comprises a holding element of the sonotrode, the holding element being arranged in the channel.

4. The system according to claim 3, wherein the holding element is a resilient element.

5. The system according to claim 4, wherein the resilient element is arranged in an axial position constituting a vibration node.

6. The system according to claim 3, wherein the holding element comprises a holding body mounted relative to the shaft sonotrode via a spring, the holding body cooperating with a guiding structure of the shaft portion.

7. The system according to claim 6, wherein the holding body has an at least partially spherical surface and/or wherein the guiding structure comprises an indentation.

8. The system according to claim 2, wherein holding mechanism comprises a suction arrangement to generate an underpressure in the channel.

9. The system according to claim 1, wherein the collar is constituted by a distal collar portion and a proximal collar portion, wherein the proximal collar portion constitutes the proximal collar face, and wherein the distal collar portion constitutes the distal collar face.

10. The system according to claim 1, wherein the stud comprises longitudinal reinforcing ribs arranged on the shaft.

11. The system according to claim 1, wherein the distal shaft portion comprises a tapering tip, a plurality of tapering tips or is tube-shaped.

12. The system according to claim 1, wherein the surface structure or geometry comprises at least one of a surface roughness, ribs, blind openings or through openings.

13. The system according to claim 1, and further comprising the object to which the stud is to be fixed, wherein, at least in a fixation location, the object comprises said material based on a thermoplastic polymer.

14. The system according to claim 13, wherein the object is a thin-walled duct made of said material based on a thermoplastic polymer.

15. The system according to claim 1, wherein the matting and the stud are adapted to each other for at least part of the shaft being capable of being pushed through the matting without the need of providing an opening in the matting.

16. The system according to claim 15, wherein the proximal shaft portion is capable of being pushed through the matting.

17. The system according to claim 1, wherein the sonotrode is designed for maximum vibration amplitude at the distal sonotrode face.

18. A method for fixing matting to an object with the aid of a plurality of studs fixed to the to an object with the aid of liquefaction or at least plastification of a material based on a thermoplastic polymer comprised by the stud or the object, the method comprising the steps of:
   providing the studs, each stud comprising an elongated shaft having a distal end, a proximal end and a longitudinal axis therebetween, and a collar extending radially from the shaft, having a distal collar face and a proximal collar face and being arranged on the shaft with a proximal shaft portion extending beyond the proximal collar face, wherein the collar is arranged on the shaft for a distal shaft portion to extend beyond the distal collar face and wherein at least the distal shaft portion comprises a material which is not liquefiable by the vibrating enemy and further comprises a surface structure or geometry suitable for forming a positive fit connection with said material based on a thermoplastic polymer in which it is embedded,
   providing a tool comprising a vibration source capable of supplying mechanical vibration energy and a sonotrode with a proximal sonotrode end and a distal sonotrode face, wherein the proximal sonotrode end is couplable to the vibration source, wherein the sonotrode is designed for vibration transmission from the proximal sonotrode end to the distal sonotrode face, and wherein the sonotrode further comprises an axial channel being open at the distal sonotrode face, wherein the axial channel is dimensioned for accommodation of the proximal shaft portion, and wherein the distal sonotrode face is adapted to the proximal collar face for enabling transmission of vibration and of a pressing force from the sonotrode to the stud, coupling the proximal sonotrode end to the vibration source, positioning the proximal shaft portion in the axial channel such that the proximal collar face abuts the distal sonotrode face, positioning, with the aid of the tool, the distal shaft portion against a fixation location on the object, applying vibration and a pressing force through the sonotrode to the stud for a time sufficient for liquefying or at least plastifying enough of said material based on a thermoplastic polymer for embedding the distal shaft portion in the fixation location, and securing the matting to the object by pushing the matting on a plurality of the fixed studs and then fixing head plates to free stud ends protruding from the matting.

19. The method according to claim 18, wherein the step of penetrating the matting is performed before or after fixation of the stud to the object.

20. The method according to claim 18, wherein fixing the head plates to the free stud ends comprises snapping the head plates into a groove provided on the stud end or ultrasonically welding the head plates of a polymer material to end faces of the studs.

21. A system for fixing a stud to an object with the aid of liquefaction or at least plastification of a material based on a thermoplastic polymer, said material being comprised by the stud or the object, the system comprising:

the stud comprising an elongated shaft having a distal end, a proximal end and a longitudinal axis therebetween, and a collar extending radially from the shaft, having a distal collar face and a proximal collar face and being arranged on the shaft with a proximal shaft portion extending beyond the proximal collar face, a tool comprising a vibration source capable of supplying mechanical vibration energy, and a sonotrode with a proximal sonotrode end and a distal sonotrode face, wherein the proximal sonotrode end is coupled or couplable to the vibration source, wherein the sonotrode is designed for vibration transmission from the proximal sonotrode end to the distal sonotrode face, and wherein the sonotrode further comprises an axial channel being open at the distal sonotrode face, and a holding mechanism configured to hold the shaft portion in the axial channel, wherein the axial channel is dimensioned for accommodation of the proximal shaft portion, and wherein the distal sonotrode face is adapted to the proximal collar face for enabling transmission of vibration and of a pressing force from the sonotrode to the stud.

22. The system according to claim 21, wherein the holding mechanism comprises a holding element of the sonotrode, the holding element being arranged in the channel.

23. The system according to claim 22, wherein the holding element is a resilient element.

24. The system according to claim 23, wherein the resilient element is arranged in an axial position constituting a vibration node.

25. The system according to claim 22, wherein the holding element comprises a holding body mounted relative to the shaft sonotrode via a spring, the holding body cooperating with a guiding structure of the shaft portion.

26. The system according to claim 25, wherein the holding body has an at least partially spherical surface and/or wherein the guiding structure comprises an indentation.

27. The system according to claim 21, wherein holding mechanism comprises a suction arrangement to generate an underpressure in the channel.

* * * * *